(12) United States Patent
Fischer et al.

(10) Patent No.: US 8,721,761 B2
(45) Date of Patent: May 13, 2014

(54) ABRASION RESISTANT COMPOSITION

(75) Inventors: Keith D. Fischer, Roanoke, IL (US); Christopher A. Barnes, Lafayette, IN (US); Stephen L. Henderson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 402 days.

(21) Appl. No.: 12/616,315

(22) Filed: Nov. 11, 2009

(65) Prior Publication Data

US 2010/0215849 A1 Aug. 26, 2010

Related U.S. Application Data

(60) Provisional application No. 61/116,986, filed on Nov. 21, 2008.

(51) Int. Cl.
*B22F 1/00* (2006.01)
*C04B 14/32* (2006.01)
*C04B 14/34* (2006.01)

(52) U.S. Cl.
USPC ............................ 75/252; 106/286.3; 106/643

(58) Field of Classification Search
USPC ................................ 106/286.3, 643
See application file for complete search history.

(56) References Cited

U.S. PATENT DOCUMENTS

| | | | |
|---|---|---|---|
| 2,105,079 A | 1/1938 | Holslag | |
| 2,549,930 A | 4/1951 | Riegel et al. | |
| 2,849,259 A | 8/1958 | Engstrom | |
| 2,874,005 A | 2/1959 | Engstrom | |
| 3,060,307 A | 10/1962 | Arnoldy | |
| 3,172,991 A | 3/1965 | Arnoldy | |
| 3,286,379 A | 11/1966 | Benetti | |
| 3,405,247 A | 10/1968 | Hlivka | |
| 3,790,353 A | 2/1974 | Jackson et al. | |
| 3,912,338 A | 10/1975 | Toews | |
| 3,936,655 A | 2/1976 | Arnoldy | |
| 3,972,570 A | 8/1976 | Massieon | |
| 4,097,711 A | 6/1978 | Banerjee | |
| 4,243,727 A | 1/1981 | Wisler et al. | |

(Continued)

FOREIGN PATENT DOCUMENTS

| | | |
|---|---|---|
| CN | 1137433 | 12/1996 |
| CN | 1683093 | 10/2005 |

(Continued)

OTHER PUBLICATIONS

KIPO, Int'l Search Report for Int'l Application No. PCT/US2009/057629, Apr. 20, 2010, 2 pp.

(Continued)

*Primary Examiner* — George Wyszomierski
*Assistant Examiner* — Ngoclan T Mai
(74) *Attorney, Agent, or Firm* — Leydig, Voit & Mayer

(57) ABSTRACT

A surface covering composition of abrasion resistant character adapted for disposition in overlying bonded relation to a metal substrate. The surface covering composition includes metal carbide particles within a metal matrix at a packing factor of not less than about 0.6. Not less than about 40 percent by weight of the metal carbide particles are characterized by an effective diameter in the range of +14-32 mesh prior to introduction to the metal matrix. Not less than about 3 percent by weight of the metal carbide particles are characterized by an effective diameter of +60 mesh prior to introduction to the metal matrix.

18 Claims, 6 Drawing Sheets

(56) References Cited

U.S. PATENT DOCUMENTS

| | | |
|---|---|---|
| 4,404,450 A | 9/1983 | Weldon |
| 4,434,642 A | 3/1984 | Rasmussen |
| 4,613,741 A | 9/1986 | Arnoldy |
| 4,723,060 A | 2/1988 | Arnoldy |
| 5,010,225 A | 4/1991 | Carlin |
| 5,111,600 A | 5/1992 | Lukavich et al. |
| 5,147,996 A | 9/1992 | Carlin |
| 5,516,053 A | 5/1996 | Hannu |
| 5,791,422 A * | 8/1998 | Liang et al. .................. 175/374 |
| 6,017,103 A | 1/2000 | Villard |
| RE37,127 E * | 4/2001 | Schader et al. ................ 75/239 |
| 6,360,832 B1 | 3/2002 | Overstreet et al. |
| 6,414,258 B1 | 7/2002 | Amano |
| 6,469,278 B1 | 10/2002 | Boyce |
| 6,564,884 B2 | 5/2003 | Bird |
| 6,571,493 B2 | 6/2003 | Amano et al. |
| 6,649,858 B2 | 11/2003 | Wakeman |
| 6,651,756 B1 | 11/2003 | Overstreet et al. |
| 6,659,206 B2 * | 12/2003 | Liang et al. .................. 175/374 |
| 7,163,754 B2 | 1/2007 | Revankar et al. |
| 7,666,244 B2 * | 2/2010 | Lockwood et al. ............ 75/240 |
| 2004/0157066 A1 | 8/2004 | Arzoumanidis |
| 2006/0005662 A1 | 1/2006 | Lockwood et al. |
| 2006/0060387 A1 | 3/2006 | Overstreet |
| 2008/0236333 A1 * | 10/2008 | MacLeod ........................ 75/255 |

FOREIGN PATENT DOCUMENTS

| | | |
|---|---|---|
| CN | 101163849 | 4/2008 |
| GB | 2357788 | 7/2001 |
| JP | 02-006097 A | 1/1990 |
| JP | 06-049228 B | 6/1994 |
| JP | 2001-47235 A | 2/2001 |
| JP | 2005-305449 A | 11/2005 |
| KR | 2000-0046435 A | 7/2000 |
| KR | 20-0396650 Y1 | 9/2005 |
| WO | WO 2007/114524 A1 | 10/2007 |

OTHER PUBLICATIONS

KIPO, Written Opinion for Int'l Application No. PCT/US2009/057629, Apr. 20, 2010, 5 pp.

KIPO, Int'l Search Report for Int'l Application No. PCT/US2009/057630, May 3, 2010, 3 pp.

KIPO, Written Opinion for Int'l Application No. PCT/US2009/057630, May 3, 2010, 7 pp.

* cited by examiner

ABRASION RESISTANT COMPOSITION

STATEMENT REGARDING FEDERALLY SPONSORED RESEARCH AND DEVELOPMENT

This disclosure was made in part with Government support under Grant Number DE-FC36-04G014037 awarded by the Department of Energy. The Government may have certain rights in this disclosure.

TECHNICAL FIELD

This patent disclosure relates generally to hardfacing treatments and, more particularly, to compositions and methods for affixing abrasion resistant surface treatments to a surface.

BACKGROUND

Hardfacing refers to a process in which a surface of a metal work piece is melted or subjected to a welding arc with a consumable electrode thereby causing a pool of molten material to form at the surface. While the surface layer is in a molten state, particles of a wear resistant material are delivered to the pool of molten material. The wear resistant particles and the molten material blend to form a composite alloy having enhanced wear resistance relative to the underlying substrate metal.

One approach to providing enhanced wear resistance to a metal work piece such as a digger tooth or the like is set forth in U.S. Pat. No. 3,882,594 to Jackson et al., having an issue date of May 13, 1975. This reference advocates applying a wear pad of cemented metal carbide within a metal matrix. The cemented carbide particles are characterized by a diverse size range of about 6 to about 30 U.S. Sieve. The carbide particles are irregularly shaped and the size range is sufficiently broad that the carbide particles are present in the range of from about 70% to 85% by volume.

SUMMARY

This disclosure describes, in one aspect, a surface covering composition of abrasion resistant character adapted for disposition in overlying bonded relation to a metal substrate. The surface covering composition includes metal carbide particles within a metal matrix at a packing factor of not less than about 0.6 as measured by relative area occupancy of the carbide particles within a measurement zone of a specimen of the surface covering composition. The measurement zone extends from the metal substrate to a position about 3 mm above the metal substrate. Not less than about 40 percent by weight of the metal carbide particles are characterized by an effective diameter in the range of +14-32 mesh prior to introduction to the metal matrix. Not less than about 3 percent by weight of the metal carbide particles are characterized by an effective diameter of +60 mesh prior to introduction to the metal matrix.

In another aspect, this disclosure describes a method of hardfacing a metal work piece. The method includes applying a surface covering composition in overlying bonded relation to a metal surface of the work piece. The surface covering composition includes metal carbide particles within a metal matrix at a packing factor of not less than about 0.6 as measured by relative area occupancy of the carbide particles within a measurement zone of a specimen of the surface covering composition. The measurement zone extends from the metal surface of the work piece to a position about 3 mm above the metal surface of the work piece. At least 40 percent by weight of the metal carbide particles are characterized by an effective diameter in the range of +14-32 mesh prior to introduction to the metal matrix, and at least 3 percent by weight of the tungsten carbide particles are characterized by an effective diameter of +60 mesh prior to introduction to the metal matrix. The surface covering composition is characterized by increased wear resistance relative to the metal surface.

DETAILED DESCRIPTION

Figure 1:
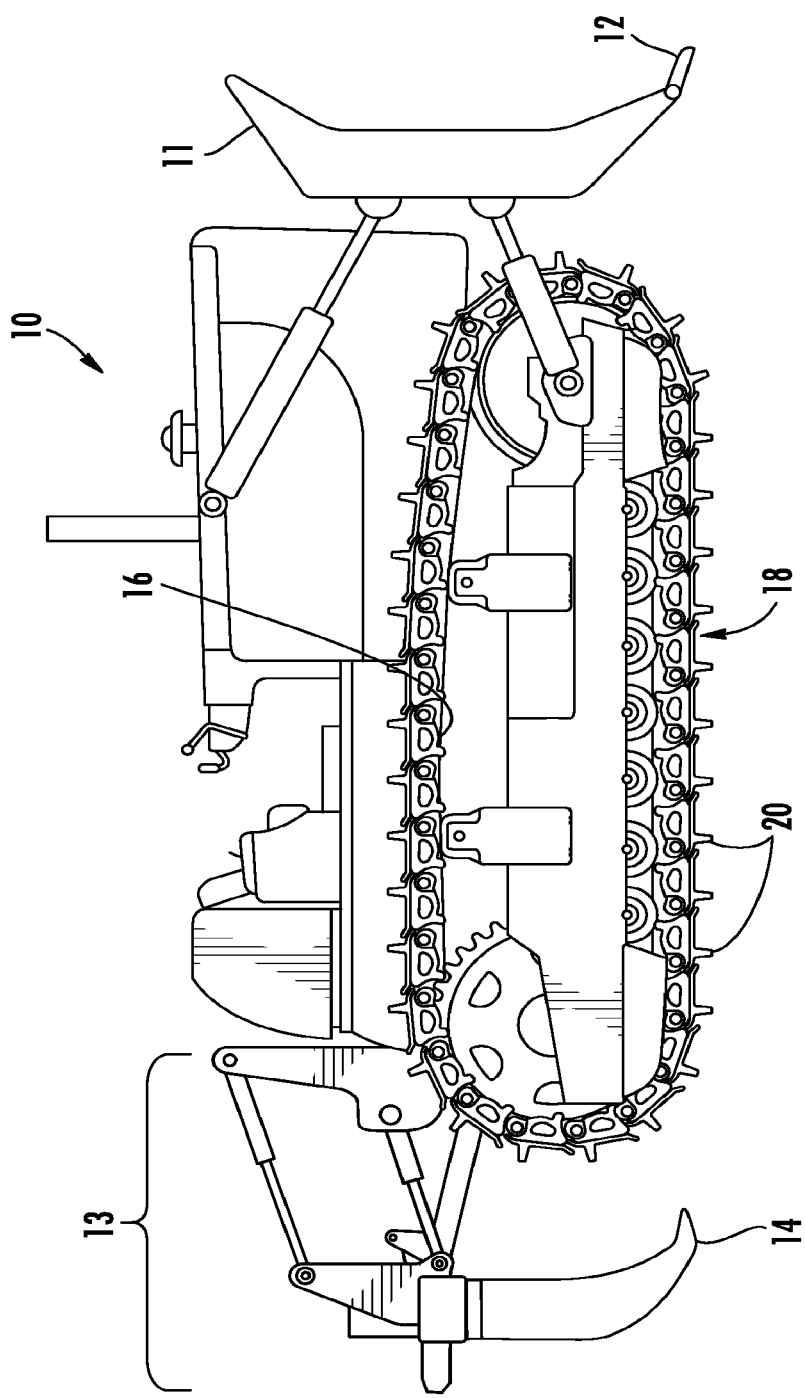
FIG. 1 is a diagrammatic side view of an exemplary machine.

Reference will now be made to the drawings wherein, to the extent possible, like elements are designated by like reference numerals throughout the various views. FIG. 1 illustrates a machine 10 of an exemplary construction having multiple systems and components that cooperate to accomplish a task. The machine 10 may embody a fixed or mobile machine, including wheeled or track-type machines, that perform some type of operation associated with an industry such as mining, construction, farming, transportation, or any other industry known in the art. For example, the machine 10 may be an earth moving machine such as a dozer, an excavator, a loader, a backhoe, a motor grader, a dump truck, or any other earth moving machine. The machine 10 may also be substantially immobile such as a drilling apparatus or the like.

In the illustrated embodiment, the machine 10 may include a push blade 11 including a cutting edge 12 adapted to engage the ground as material is moved by pushing action. The machine 10 may also include an implement system 13 configured to move a work tool 14 such as a ripper arm, bucket, drill or any other ground engaging tool. The machine 10 illustrated in FIG. 1 includes a track 16 with an arrangement of track shoes 18 including outwardly projecting grousers 20. The track shoes 18 are adapted to engage the ground during operation. As will be appreciated, various components of the machine 10 including, without limitation, the cutting edge 12, the work tool 14 and the grousers 20 may be subjected to substantial abrasion during operation. Of course, any number of other components within the machine 10 may also be subjected to abrasion. Such abrasion may lead to premature wear and the need for replacement. Such wear may be particularly acute in articles formed from ductile material such as a plain machineable carbon steel or the like.

Figure 2:
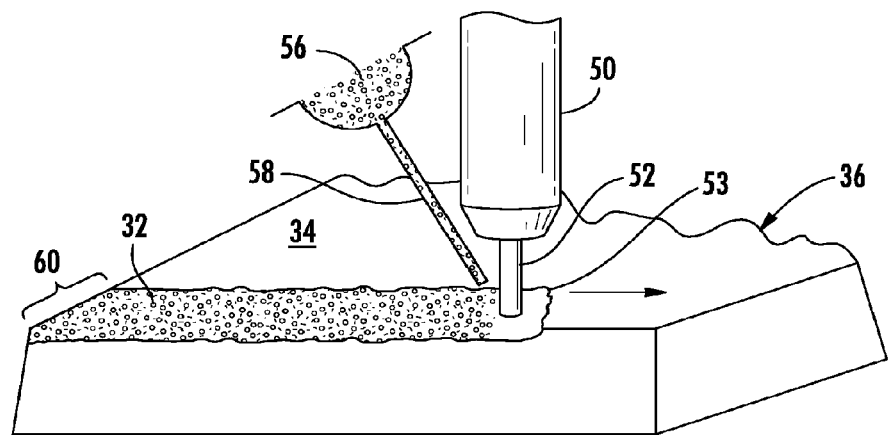
FIG. 2 is a diagrammatic view illustrating an exemplary hardfacing process for application of a covering layer of wear resistant material to a surface of a work piece.
Figure 3:
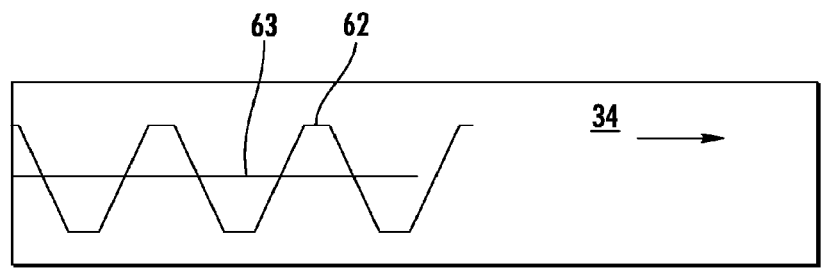
FIG. 3 is a diagrammatic view illustrating an exemplary pattern for application of a hardfacing treatment to a surface of a work piece.

By way of example only, and not limitation, FIG. 2 illustrates one exemplary practice for application of an abrasion resistant surface covering 32 using a hardfacing treatment across a surface 34 of a work piece 36 such as a grouser bar 20, cutting edge 12, work tool 14 or any other metal structure as may be desired. As shown, during the exemplary hardfacing treatment, the surface 34 being treated may be positioned in generally opposing relation to a welding head 50 including an electrode 52 of consumable mild steel wire or the like. As an arc is developed between the welding head 50 and the opposing surface 34, the electrode 52 is liquefied and forms a liquid pool 53 across the surface 34. A portion of the material forming the work piece 36 may also undergo melting to a relatively shallow depth, thereby providing additional liquid to the liquid pool 53. The liquid pool may be developed progressively by moving the welding head 50 relative to the surface of the work piece 36 as indicated by the directional arrow. Of course, it is also contemplated that the welding head 50 may remain stationary with relative movement of the work piece 36 if desired.

Although the use of the welding head 50 with an electrode 52 of consumable character may be beneficial in many environments of use, it is contemplated that virtually any localized heating technique may be used to form the liquid pool 53 across the surface 34 being treated. By way of example only, the use the electrode 52 may be of a non-consumable character such that the liquid pool 53 is formed exclusively from the material making up the work piece 36. Likewise, a torch or other heating device may be used in place of the welding head 50 either with or without a consumable member. Accordingly, the formation of the liquid pool 53 is in no way dependent upon the use of any particular equipment or process.

Particles 56 of wear resistant material are delivered to the liquid pool 53 for development of a wear resistant composite alloy upon resolidification of the liquid pool 53 to form the abrasion resistant surface covering 32. By way of example only, one suitable material for the particles 56 is cemented tungsten carbide bonded together with cobalt. One potentially useful source of suitable particles 56 is cemented tungsten carbide of fractal dimensionality recovered from ground drill bits used in machining operations. However, other materials may likewise be utilized if desired. Accordingly, it is contemplated that at least a portion of the particles 56 may be formed from other materials including, without limitation, cast tungsten carbide, macrocrystalline tungsten carbide as well as carbides of other metals including molybdenum, chromium, vanadium, titanium, tantalum, beryllium, columbium, and blends thereof characterized by enhanced wear resistance relative to the substrate material forming the work piece 36. Upon resolidification, the resultant abrasion resistant surface covering 32 includes the particles 56 of the wear-resistant material within a bonding matrix of steel or other base metal that previously formed the liquid pool 53.

As will be appreciated, during the hardfacing treatment, the liquid pool 53 is disposed at a relatively localized position and remains in a liquid state for a limited period of time before resolidification takes place. Thus, it is advantageous to deliver the particles 56 in conjunction with formation of the liquid pool. By way of example only, and not limitation, one exemplary particle delivery practice may utilize a drop tube 58 of substantially hollow construction which moves along a path generally behind the welding head 50. The particles 56 are typically applied at a level of about of about 0.1 to about 0.3 grams per square centimeter of the treatment zone, although higher or lower levels may be used if desired.

The treatment zone width 60 provided by a pass of the welding head 50 and the drop tube 58 may be controlled by the pattern of movement of the welding head 50. By way of example, in the event that a relatively narrow treatment zone width 60 is desired, the welding head 50 may move in a substantially straight line with the drop tube 58 following directly behind. Such a straight line pattern may typically be used to yield a treatment zone width 60 of about 15 millimeters or less. In the event that a wider treatment zone width is desired, the welding head may be moved in a generally zigzag pattern 62 such as is shown by the solid line in FIG. 4 with the drop tube 58 trailing in a substantially straight path 63 generally along the middle of the zigzag pattern 62 as shown by the dotted line in FIG. 4. The zigzag pattern 62 provides a wider liquid pool for acceptance of the particles 56 which may be deposited at the midpoint of the formed pool. In the event that a more extensive treatment zone width is desired, the welding head 50 may make multiple passes in adjacent relation to one another to substantially cover any portion of the surface 34 as may be desired.

It has been found that incorporating a significant weight percentage of relatively small particles in combination with larger particles may promote an enhanced packing factor of such particles in the final abrasion resistant surface covering 32 and may enhance performance. In this regard, it is to be understood that the term "packing factor" refers to the ratio of the volume of the composite alloy occupied by the applied particles in the solidified state within a defined region relative to the volume of the abrasion resistant surface covering 32 within that defined region. Thus, a region of the abrasion resistant surface covering 32 in which the applied particles occupy 50% of the total volume in the solidified state will have a packing factor of 0.5.

Figure 4:
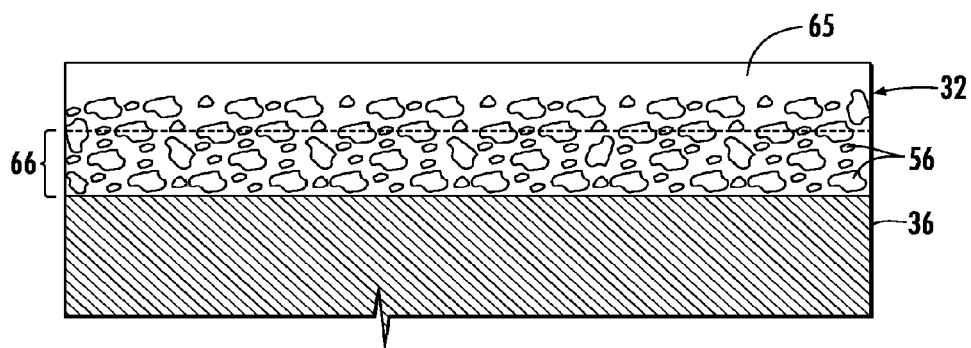
FIG. 4 is a diagrammatic view of a cross-section of an applied abrasion resistant surface covering overlying a work piece.

According to one practice which may be used to evaluate packing factor, one or more cross-sections may be cut through the abrasion resistant surface covering 32 and the underlying work piece 36 as shown diagrammatically in FIG. 4. As shown, the cross section includes a portion of the work piece 36 with the overlying abrasion resistant surface covering 32. The particles 56 are concentrated in a band extending away from the work piece 36. At the time of formation, an outer zone 65 having very few particles may be disposed at the extreme outer surface. This outer zone 65 is formed substantially from the matrix material generated by the melting electrode 52. As will be appreciated, when subjected to an abrasive environment, the outer zone 65 may tend to exhibit initial rapid wear until a concentrated zone of the particles 56 becomes exposed. Thereafter, wear is substantially reduced. FIGS. 5-8 present micrographs of applied abrasion resistant surface coverings showing representative orientations corresponding substantially to FIG. 4. The boxes in FIGS. 5 and 7 extend generally from the underlying work piece to the lower edge of the outer zone, thereby illustrating the concentration of particles in that region.

The cross sections may be etched and polished to display the particles 56 within the matrix. A measurement zone 66 may then be defined within the etched and polished surface. The ratio of the surface area occupied by the particles 56 within the measurement zone 66 to the total area of the measurement zone 66 defines an area occupancy ratio which may be used as a measurement of the packing factor. By way of example only, evaluating the surface area occupied by the particles 56 in a standardized measurement zone extending from the surface of the work piece 36 to a position about 3 millimeters above the surface of the work piece 36 may be useful in evaluating the packing factor in portions of the abrasion resistant surface covering 32 near the work piece 36 having high concentrations of particles 56. Although a single sample may be used, enhanced accuracy may be achieved by evaluating multiple samples and averaging the area occupancy ratios in those samples.

Accordingly to one exemplary practice, the particles 56 of wear resistant material may be characterized by an effective diameter in the range of about +14-120 mesh. That is, the particles will be small enough to pass through a U.S. Standard 14 mesh screen (1410 microns) and will be blocked from passing through a U.S. Standard 120 mesh screen (125 microns). Within this broad range, it may be desirable for significant percentages of particles to occupy sub-ranges to provide a diverse population of particle sizes. Such a diverse particle size distribution permits smaller particles to cooperatively fill spaces between the larger particles to enhance the overall packing factor. By way of example only, one exemplary size distribution for the applied particles 56 is set forth in Table I below.

TABLE I

| Effective Diameter (Mesh) | Wt. % |
| --- | --- |
| +14-22 | 40%-70% |
| +22-32 | 10%-25% |
| +32-60 | 10%-25% |
| +60-120 | 3%-10% |

Utilization of such particle size distributions may yield final packing factors of about 0.6 to about 0.7. For some applications, it may be desirable for at least 3% and more desirably about 5% to about 10% to have an effective diameter of +80 mesh such that those particles pass through an 80 mesh screen.

If desired, it is contemplated that the particle size distribution may be adjusted to substantially reduce or eliminate particles in the +14-22 mesh range thereby shifting the distribution towards smaller effective diameters corresponding to higher mesh numbers. However, in general, it may be desirable for many applications that at least 40% by weight of the particles have an effective diameter large enough to be blocked by a 32 mesh screen. The presence of such larger particles may provide additional stability in highly abrasive environments such as may be present if the work piece 36 engages igneous rock, quartz, slag or other similar media. It is also contemplated that minor percentage of particles having an effective diameter greater than 14 mesh or smaller than 120 mesh may be applied if desired. However, it may be desirable for about 95% or more by weight of the particles to be within the +14-120 mesh range.

By way of example only, a size distribution for applied particles of wear resistant material which may be particularly desirable for some applications is set forth in Table II below.

TABLE II

| Effective Diameter (Mesh) | Wt. % |
| --- | --- |
| +14-22 | 65% |
| +22-32 | 15% |
| +32-60 | 15% |
| +60-80 | 0% |
| +80-120 | 5% |

Utilization of such a particle size distribution yields a final packing factor of about 0.7.

As will be appreciated, during the hardfacing procedure, surface tension characteristics cause the melted material to form a generally convex raised bead across the surface 34 of the work piece 36. The introduction of the particles 56 may tend to enhance the volume of this raised bead. This raised bead structure is generally retained upon resolidification of the composite alloy. By way of example only, the final solidified composite alloy may be raised about 4 millimeters relative to the plane of the surface 34 being treated and extend to a depth of about 2 millimeters below the plane of the surface 34 being treated due to melting of the base material. However, these levels may be increased or decreased as desired.

Features consistent with the present disclosure may be readily understood through reference to the following non-limiting examples.

Example 1

Figure 5:
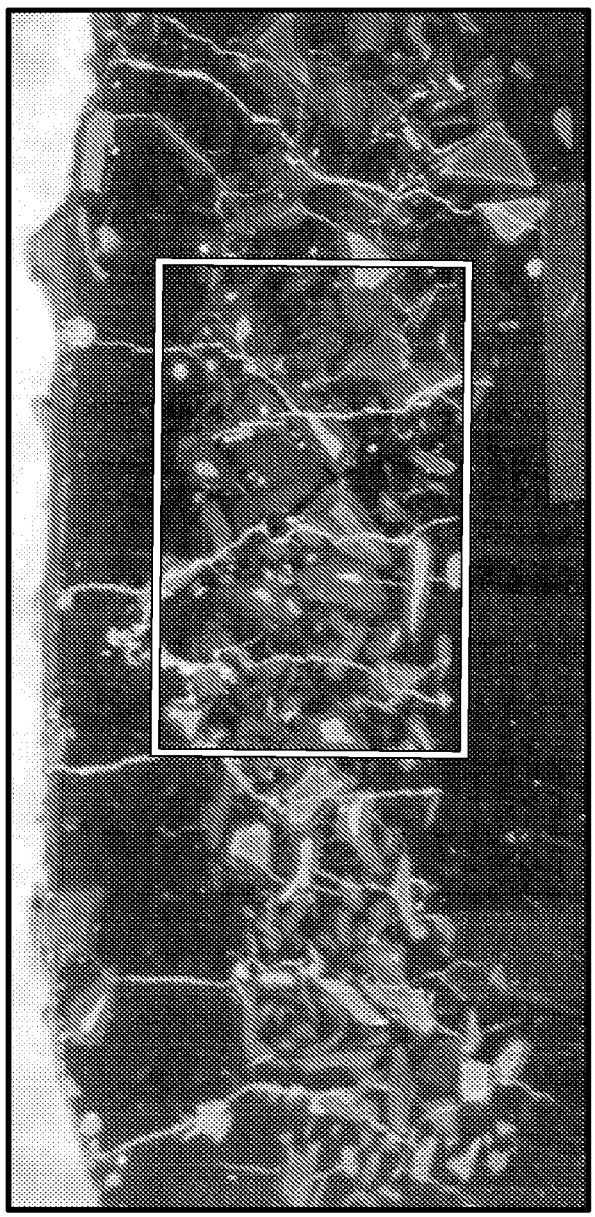
FIG. 5 is a micrograph showing a section view of an applied abrasion resistant surface covering incorporating particles characterized by a first size distribution.
Figure 6:
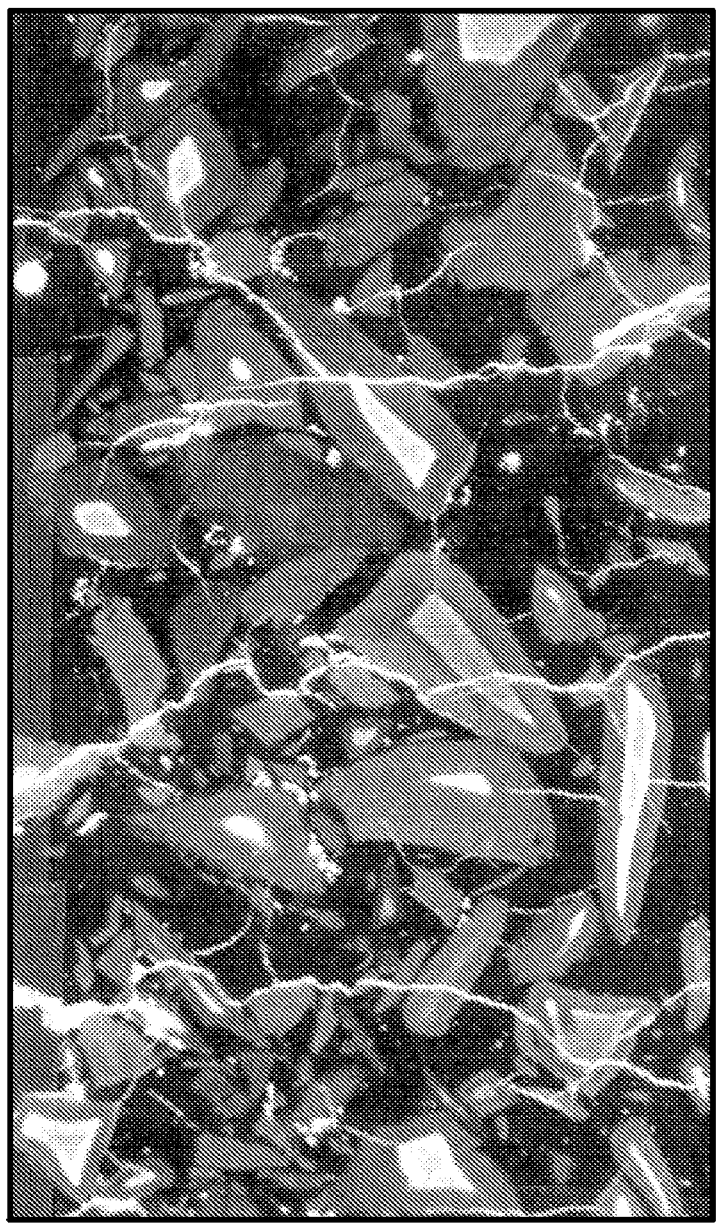
FIG. 6 is a micrograph showing a portion of the section view of FIG. 5 at enhanced magnification.

FIGS. 5 and 6 are cross-sectional micrographs of an abrasion resistant surface covering of tungsten carbide particles within a steel matrix utilizing cemented tungsten carbide particles with a size range of +14-120 mesh. Approximately 64% by weight of the applied particle mass was in the size range +14-22 mesh. Approximately 16% by weight of the applied particle mass was in the size range +22-33 mesh. Approximately 16% by weight of the applied particle mass was in the size range +33-60 mesh. Approximately 4% by weight of the applied particle mass was in the size range +60-120 mesh. The particles were applied in a hardfacing procedure at a drop rate of 250 grams per minute using a weld head with a wire speed of 350 inches per minute, a travel speed of 10.8 inches per minute and a voltage of 29 volts. Based on relative area occupancy, the packing factor of the tungsten carbide particles was in the range of 0.6 to 0.7.

Example 2

Comparative

Figure 7:
FIG. 7 is a micrograph showing a section view of an applied abrasion resistant surface covering incorporating particles characterized by a second size distribution at the same magnification as FIG. 5.
Figure 8:
FIG. 8 is a micrograph showing a portion of the section view of FIG. 7 at the same magnification as FIG. 6.

FIGS. 7 and 8 are cross-sectional micrographs of an abrasion resistant surface covering of tungsten carbide particles within a steel matrix utilizing cemented tungsten carbide particles with a size range of +14-24 mesh. The test procedures as outlined in Example 1 were repeated in all respects except that the abrasion resistant material utilized cemented tungsten carbide particles with a size range of +14-24 mesh. Based on relative area occupancy, the packing factor of the tungsten carbide particles was in the range of 0.4 to 0.5.

INDUSTRIAL APPLICABILITY

A work piece including an abrasion resistant surface covering consistent with the present disclosure may find application in virtually any environment of use wherein metal articles are subjected to abrasive wear. Such environments may include mining, construction, farming, hydrocarbon extraction, transportation, or any other industry known in the art. By way of example only, such an abrasion resistant surface covering may be applied in bonded relation to surfaces of a cutting edge or work tool in a mobile or fixed machine.

According to one exemplary use, an abrasion resistant surface covering consistent with the present disclosure may be applied across one or more surfaces of a grouser bar on a track shoe for a track-type vehicle. Such track-type vehicles may include crawler-type bulldozers, rippers, pipelayers, loaders, excavators and the like. The track shoe defines a ground-engaging surface at the exterior of a track. The abrasion resistant surface covering provides enhanced abrasion resistance thereby prolonging useful life and enhanced machine productivity.

What is claimed is:

1. A surface covering composition adapted for disposition in overlying bonded relation to a metal substrate, the surface covering composition comprising a plurality of metal carbide particles disposed within a metal matrix at a packing factor of not less than about 0.6 as measured by area occupancy ratio of the carbide particles within a defined measurement zone within the surface covering composition, the defined measurement zone extending from the metal substrate to a position about 3 mm above the metal substrate, at least 40 percent by weight of said metal carbide particles being characterized by an effective diameter in the range of +14-32 mesh prior to introduction to the metal matrix, at least 10 percent by weight of said metal carbide particles being characterized by an effective diameter in the range of +32-60 mesh prior to introduction to the metal matrix, and at least 3 percent by weight of said metal carbide particles being characterized by an effective diameter in the range of +80-120 mesh prior to introduction to the metal matrix.

2. The surface covering composition as recited in claim 1, wherein at least a portion of said metal carbide particles include tungsten carbide particles.

3. The surface covering composition as recited in claim 2, wherein at least a portion of said tungsten carbide particles are cemented with cobalt.

4. The surface covering composition as recited in claim 1, wherein at least a portion of said metal carbide particles include tungsten carbide particles cemented with cobalt and said metal matrix is steel.

5. The surface covering composition as recited in claim 1, wherein at least 10 percent by weight of said metal carbide particles are characterized by an effective diameter in the range of +22-32 mesh prior to introduction to the metal matrix.

6. The surface covering composition as recited in claim 5, wherein at least 5 percent by weight of said metal carbide particles are characterized by an effective diameter of +60 mesh prior to introduction to the metal matrix.

7. The surface covering composition as recited in claim 1, wherein at least 50 percent by weight of said metal carbide particles are characterized by an effective diameter in the range of +14-32 mesh prior to introduction to the metal matrix.

8. The surface covering composition as recited in claim 7, wherein at least 10 percent by weight of said metal carbide particles are characterized by an effective diameter in the range of +22-32 mesh prior to introduction to the metal matrix.

9. The surface covering composition as recited in claim 8, wherein at least 5 percent by weight of said metal carbide particles are characterized by an effective diameter of +60 mesh prior to introduction to the metal matrix.

10. The surface covering composition as recited in claim 1, wherein at least 70 percent by weight of said metal carbide particles are characterized by an effective diameter in the range of +14-32 mesh prior to introduction to the metal matrix.

11. The surface covering composition as recited in claim 10, wherein at least 10 percent by weight of said metal carbide particles are characterized by an effective diameter in the range of +22-32 mesh prior to introduction to the metal matrix.

12. The surface covering composition as recited in claim 11, wherein at least 5 percent by weight of said metal carbide particles are characterized by an effective diameter of +60 mesh prior to introduction to the metal matrix.

13. A surface covering composition adapted for disposition in overlying bonded relation to a metal substrate, the surface covering composition comprising a plurality of tungsten carbide particles disposed within a steel matrix at a packing factor of not less than about 0.6, as measured by average area occupancy ratio of the carbide particles within a defined measurement zone within the surface covering composition, the defined measurement zone extending from the metal substrate to a position about 3 mm above the metal substrate, at least 95% by weight of said tungsten carbide particles being characterized by an effective diameter in the range of +14-120 mesh prior to introduction to the steel matrix, at least 40 percent by weight of said tungsten carbide particles being characterized by an effective diameter in the range of +14-32 mesh prior to introduction to the steel matrix, at least 10 percent by weight of said tungsten carbide particles are characterized by an effective diameter in the range of +32-60 mesh prior to introduction to the steel matrix, and at least 3 percent by weight of said tungsten carbide particles being characterized by an effective diameter of +80 mesh prior to introduction to the steel matrix.

14. The surface covering composition as recited in claim 13, wherein at least 50 percent by weight of said tungsten carbide particles are characterized by an effective diameter in the range of +14-32 mesh prior to introduction to the steel matrix.

15. The surface covering composition as recited in claim 14, wherein at least 5 percent by weight of said tungsten carbide particles are characterized by an effective diameter of +80 mesh prior to introduction to the steel matrix.

16. The surface covering composition as recited in claim 13, wherein at least 70 percent by weight of said tungsten carbide particles are characterized by an effective diameter in the range of +14-32 mesh prior to introduction to the steel matrix.

17. The surface covering composition as recited in claim 16, wherein at least 5 percent by weight of said tungsten carbide particles are characterized by an effective diameter of +80 mesh prior to introduction to the steel matrix.

18. The surface covering composition as recited in claim 13, wherein at least 65 percent by weight of said tungsten carbide particles are characterized by an effective diameter in the range of +14-32 mesh prior to introduction to the steel matrix.

* * * * *